(12) United States Patent
Cohan et al.

(10) Patent No.: US 11,358,493 B2
(45) Date of Patent: Jun. 14, 2022

(54) FUEL CELL VEHICLE THERMAL MANAGEMENT SYSTEM AND METHOD FOR MANAGING FUEL CELL THERMAL LOADS

(71) Applicant: Nikola Corporation, Phoenix, AZ (US)

(72) Inventors: Aiden Cohan, Phoenix, AZ (US); Akshit Markan, Phoenix, AZ (US); Mitchell Shinn, Phoenix, AZ (US); Katherine Smith, Phoenix, AZ (US); Rachel Cook, Phoenix, AZ (US)

(73) Assignee: Nikola Corporation, Phoenix, AZ (US)

( * ) Notice: Subject to any disclaimer, the term of this patent is extended or adjusted under 35 U.S.C. 154(b) by 0 days.

(21) Appl. No.: 17/548,805

(22) Filed: Dec. 13, 2021

(65) Prior Publication Data
US 2022/0111763 A1 Apr. 14, 2022

Related U.S. Application Data

(62) Division of application No. 17/319,896, filed on May 13, 2021, now Pat. No. 11,279,258.

(60) Provisional application No. 63/089,998, filed on Oct. 9, 2020.

(51) Int. Cl.
| | |
|---|---|
| *H01M 8/04007* | (2016.01) |
| *H01M 8/04014* | (2016.01) |
| *B60H 1/14* | (2006.01) |
| *B60L 58/27* | (2019.01) |
| *B60L 58/34* | (2019.01) |

(52) U.S. Cl.
CPC ............ *B60L 58/34* (2019.02); *B60H 1/143* (2013.01); *B60L 58/27* (2019.02); *H01M 8/04014* (2013.01); *H01M 8/04074* (2013.01)

(58) Field of Classification Search
CPC ......... B60L 58/34; B60L 58/27; B60H 1/143; H01M 8/04014; H01M 8/04074
See application file for complete search history.

(56) References Cited

U.S. PATENT DOCUMENTS

| | | | |
|---|---|---|---|
| 2005/0022550 A1* | 2/2005 | Yoshii | H01M 8/04014 62/438 |
| 2008/0145731 A1* | 6/2008 | Sakajo | H01M 8/04014 429/442 |
| 2010/0258063 A1* | 10/2010 | Thompson | H01M 10/663 123/41.19 |

(Continued)

OTHER PUBLICATIONS

USPTO; International Search Report and Written Opinion in the PCT Application No. PCT/US2021/032292 dated Sep. 7, 2021.

(Continued)

*Primary Examiner* — Muhammad S Siddiquee
(74) *Attorney, Agent, or Firm* — Snell & Wilmer L.L.P.

(57) ABSTRACT

The present disclosure provides a method of managing thermal loads in a fuel cell vehicle. The method may comprise heating a fuel cell coolant of a fuel cell coolant loop utilizing waste heat from a fuel cell to form a heated fuel cell coolant, heating a battery coolant of a battery coolant loop utilizing waste heat from a battery to form a heated battery coolant, heating a refrigerant of a battery refrigeration loop by exchanging heat with the heated battery coolant, and superheating the refrigerant of the battery refrigeration loop by exchanging heat with the heated fuel cell coolant.

12 Claims, 5 Drawing Sheets

(56) References Cited

U.S. PATENT DOCUMENTS

| | | | |
|---|---|---|---|
| 2012/0122000 A1* | 5/2012 | Lee .................... | H01M 8/0432 |
| | | | 429/429 |
| 2012/0304673 A1* | 12/2012 | Betts ................. | H01M 8/04029 |
| | | | 62/238.1 |
| 2012/0304674 A1* | 12/2012 | Schwarzkopf ..... | B60H 1/00878 |
| | | | 62/238.1 |
| 2014/0049206 A1 | 2/2014 | Sridhar et al. | |
| 2018/0029483 A1* | 2/2018 | Del Core ................ | B60L 8/006 |
| 2019/0381857 A1 | 12/2019 | Lee et al. | |
| 2020/0220236 A1 | 7/2020 | Durrani | |
| 2021/0323380 A1* | 10/2021 | Ishizeki ............. | B60H 1/00457 |

OTHER PUBLICATIONS

USPTO; Requirement for Restriction in U.S. Appl. No. 17/319,896 dated Nov. 15, 2021.
USPTO; Notice of Allowance in U.S. Appl. No. 17/319,896 dated Dec. 1, 2021.

\* cited by examiner

FUEL CELL VEHICLE THERMAL MANAGEMENT SYSTEM AND METHOD FOR MANAGING FUEL CELL THERMAL LOADS

CROSS-REFERENCE TO RELATED APPLICATIONS

This application is a divisional of U.S. Ser. No. 17/319,896 filed on May 13, 2021 and entitled "FUEL CELL VEHICLE THERMAL MANAGEMENT SYSTEM AND METHOD FOR MANAGING FUEL CELL THERMAL LOADS." U.S. Ser. No. 17/319,896 claims priority to and the benefit of U.S. Provisional Application No. 63/089,998 filed Oct. 9, 2020 and entitled "FUEL CELL VEHICLE THERMAL MANAGEMENT SYSTEM AND METHOD FOR MANAGING FUEL CELL THERMAL LOADS." The entirety of each of the foregoing applications is herein incorporated by reference, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to thermal management systems, and more particularly, to thermal management systems for fuel cell electric vehicles.

BACKGROUND

Fuel cell electric vehicles (FCEVs) utilize multiple fuel cells, combined in what is known as a fuel cell stack, to generate an electric current to power one or more system components to operate the vehicle. For example, the electric current generated by the fuel cell stack may be used to power one or more electric motors to drive the vehicle's wheels as well as power multiple other electrically operated systems of the vehicle. The electrochemical process used by the fuel cell stack (or other vehicle systems such as a battery) to generate this current may generate large amounts of heat that may desirably be disposed to prevent adverse impact on fuel cell and vehicle lifespan and performance. Traditionally, waste heat from the fuel cell stack (and/or battery) is captured by a coolant and routed to a radiator that allows the waste heat to be released to the ambient environment and thereby removed from the system. Accordingly, approaches which utilize this waste heat in alternative ways to increase system thermal efficiency and increase vehicle lifespan and performance are desirable.

SUMMARY

A method of managing thermal loads in a fuel cell vehicle may comprise heating a fuel cell coolant of a fuel cell coolant loop utilizing waste heat from a fuel cell to form a heated fuel cell coolant, heating a battery coolant of a battery coolant loop utilizing waste heat from a battery to form a heated battery coolant, heating a refrigerant of a battery refrigeration loop by exchanging heat with the heated battery coolant, and superheating the refrigerant of the battery refrigeration loop by exchanging heat with the heated fuel cell coolant.

In various embodiments, the method may further comprise compressing the refrigerant of the battery refrigerant loop after superheating the refrigerant. The method may further comprise condensing the refrigerant of the battery refrigeration loop after compressing the refrigerant. The method may further comprise expanding the refrigerant of the battery refrigeration loop after condensing the refrigerant. The refrigerant of the battery refrigeration loop may be superheated after the battery refrigerant is heated by exchanging heat with the heated battery coolant. Superheating the refrigerant of the battery refrigeration loop may further comprise directing the heated fuel cell coolant through a bypass valve to a superheating heat exchanger configured to facilitate heat transfer from the heated fuel cell coolant to the refrigerant.

A method of utilizing waste heat from a fuel cell may comprise absorbing waste heat from the fuel cell utilizing a coolant passing through a fuel cell coolant loop, passing the coolant through a superheating heat exchanger thermally coupled between the fuel cell coolant loop and a battery refrigeration loop, exchanging heat between the coolant and a refrigerant of the battery refrigeration loop in the superheating heat exchanger to increase a temperature of the refrigerant, and compressing the refrigerant in a compressor thermally coupled to the superheating heat exchanger.

In various embodiments, the method may further comprise absorbing waste heat from a battery utilizing a coolant passing through a battery coolant loop.

A thermal management system for a fuel cell vehicle may comprise a battery, a fuel cell, a battery coolant loop thermally coupled to the battery and comprising a first radiator and a chiller, a fuel cell coolant loop thermally coupled to the fuel cell and comprising a second radiator and a superheating heat exchanger, and a battery refrigeration loop comprising the superheating heat exchanger thermally coupled to the chiller and a compressor, wherein the superheating heat exchanger is configured to transfer waste heat from the fuel cell to a refrigerant of the battery refrigeration loop prior to the refrigerant entering the compressor.

In various embodiments, the battery coolant loop further comprises a first pump, a first bypass valve, and a first expansion tank. The fuel cell coolant loop may further comprise a second pump, a second bypass valve, and a second expansion tank. The battery refrigeration loop may further comprise a condenser and an expansion valve. The battery, the first radiator, the chiller, the first pump, the first bypass valve, and the first expansion tank may be thermally and fluidly coupled via a battery coolant line. The fuel cell, the second radiator, the second pump, the second bypass valve, and the second expansion tank may be thermally and fluidly coupled via a fuel cell coolant line. The superheating heat exchanger, the chiller, the compressor, the condenser, and the expansion valve may be thermally and fluidly coupled via a battery refrigerant line. The fuel cell may comprise a proton-exchange membrane (PEM) fuel cell and forms a portion of a fuel cell stack. The first bypass valve and the second bypass valve may each comprise a three-way valve. The first bypass valve may be configured to selectively divert flow of a battery coolant in the battery coolant loop to the first radiator, the chiller, or a combination of the first radiator and the chiller. The second bypass valve may be configured to selectively divert flow of a fuel cell coolant in the fuel cell coolant loop to the second radiator, the superheating heat exchanger, or a combination of the second radiator and the superheating heat exchanger. The first radiator and the second radiator may each comprise a fan configured to assist in convective heat transfer to an external environment.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with electric vehicles, fuel cell electric vehicles, compressed natural gas (CNG) vehicles, hythane (mix of hydrogen and natural gas) vehicles, and/or the like. However, various aspects of the disclosed embodiments may be adapted for performance in a variety of other systems. Further, in the context of the present disclosure, methods, systems, and articles may find particular use in any system requiring use of a battery, fuel cell, and/or thermal management system of the same. As such, numerous applications of the present disclosure may be realized.

Modern electric vehicles may utilize various power sources to provide electric current to one or more electric motors configured to drive the vehicle's wheels. Among the types of electric vehicles currently being researched and developed at a wide scale are FCEVs and battery electric vehicles (BEVs). Similar to traditional internal combustion engine vehicles (ICEVs), electric vehicles may generate large amounts of waste heat through the operation of various system components. For example, battery systems may generate waste heat as a result of enthalpy changes, electrochemical polarization, and resistive heating inside of battery cells. Fuel cells may generate heat as a result of exothermic chemical reactions taking place in fuel cell catalyst layers. In the case of batteries, this additional heat can adversely impact the operation of the battery and reduce the life of the battery. While many types of fuel cells can efficiently operate at much higher temperature ranges than can batteries, the heat generated by the operation of the fuel cell may still impact other system components near the fuel cell. Accordingly, modern electric vehicles are typically equipped with one or more thermal management systems capable of managing the operating temperatures of various system components. Thermal efficiency of a thermal management system may be increased by utilizing waste heat for other system components that utilize an input of a thermal load. Moreover, by increasing the thermal efficiency of the thermal management system, certain components of the thermal management system may require less power from on-board batteries. As a result, battery capacity may be preserved and instead be utilized for other desirable purposes, for example to increase vehicle range.

Figure 1:
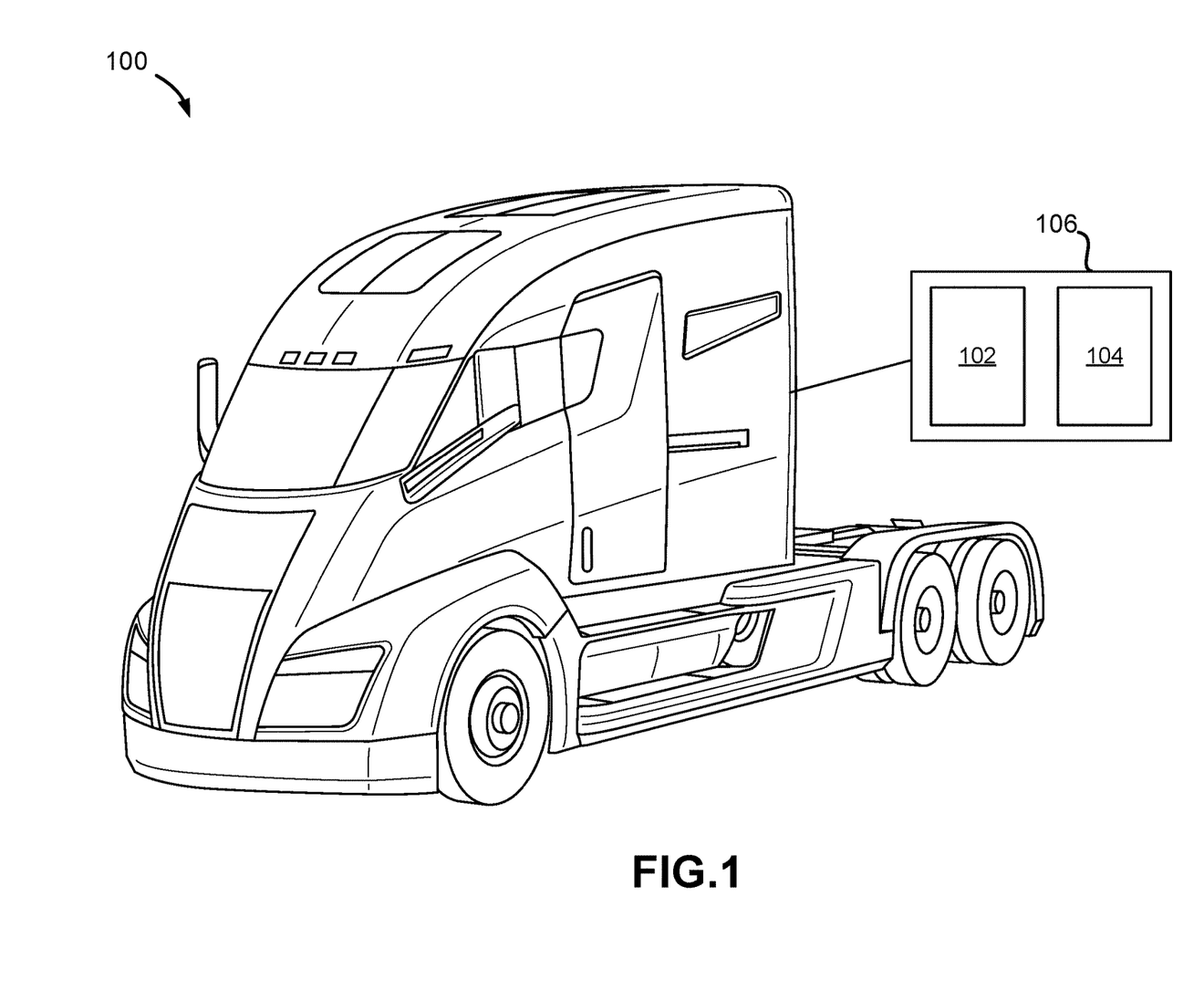
FIG. 1 illustrates a perspective view of a fuel cell electric vehicle containing a thermal management system, in accordance with various embodiments.

Accordingly, with reference to FIG. 1, a perspective view of a vehicle 100 incorporating a thermal management system is illustrated, in accordance with various embodiments. Vehicle 100 is a fuel cell electric vehicle incorporating an electric powertrain. More specifically, vehicle 100 is an electric commercial vehicle, such as, for example, a class 8 heavy duty commercial vehicle. While described herein as a fuel cell electric vehicle, vehicle 100 is not limited in this regard and may comprise any type, size, or function of vehicle. For example, vehicle 100 may comprise a battery electric vehicle, CNG vehicle, hythane vehicle, or any other suitable vehicle. Moreover, vehicle 100 may comprise a commercial vehicle of a different weight class or a passenger vehicle in various embodiments. It should be appreciated that vehicle 100 may comprise any vehicle type that can utilize a thermal management system wherein waste heat from certain system components may be at least partially salvaged and utilized in connection with a vapor-compression refrigeration loop as discussed in further detail below.

With continued reference to FIG. 1, vehicle 100 may comprise a fuel cell stack 102 and a battery 104, which may be thermally regulated by a thermal management system 106. Fuel cell stack 102 and/or battery 104 may be configured to power one or more electric motors to drive vehicle 100. For example, fuel cell stack 102 and/or battery 104 may operate alone, in an alternating fashion, and/or in an alternating or staggered fashion to provide current to the one or more electric motors depending on operational objectives or conditions. As a result, fuel cell stack 102 and battery 104 may undergo times of relatively low energy output (corresponding to relatively low heat output) and times of relatively high energy output (corresponding to relatively high heat output). Additionally, battery 104 may undergo periods of elevated heat output responsive to charging of battery 104. Thermal management system 106, as will be discussed in further detail below, may be configured to monitor and/or manage temperatures of fuel cell stack 102, battery 104, control electronics of the same, and/or other system components. For example, thermal management system 106, which can be in thermal communication with fuel cell stack 102, battery 104, and other system components, may comprise multiple coolant and/or refrigeration loops configured to transfer thermal energy from areas of higher temperature to areas of lower temperature.

In various embodiments, fuel cell stack 102 may comprise one or more fuel cells capable of facilitating an electrochemical reaction to produce an electric current. For example, the one or more fuel cells may be proton-exchange membrane (PEM) fuel cells which may receive a fuel source (such as diatomic hydrogen gas) which may react with an oxidizing agent (such as oxygen) to generate electricity with heat and water as byproducts. The fuel cells may be electrically coupled in series and/or parallel to increase voltage and/or current and form fuel cell stack 102. In various embodiments, fuel cell stack 102 may comprise fuel cells other than PEM fuel cells, for example, alkaline fuel cells, phosphoric acid fuel cells, molten carbonate fuel cells, solid oxide fuel cells, or any other suitable fuel cell type. As will be discussed further below, fuel cell stack 102 may form a portion of a fuel cell coolant loop configured to manage heat released from fuel cell stack 102.

Battery 104 may be a rechargeable, or secondary, battery configured to store energy from an external power source (for example, a charging station), from fuel cell stack 102, from a solar panel disposed on vehicle 100, and/or from regenerative braking or other applications. Battery 104 may release this stored energy in the form of electricity to power one or more electric motors and/or to supply power to other vehicle components utilizing electricity to operate. In various embodiments, battery 104 may be a lithium-ion battery; however, battery 104 is not limited in this regard and may comprise other rechargeable battery types such as a lead-acid battery, nickel-cadmium battery, nickel-metal hydride battery, lithium iron sulfate battery, lithium iron phosphate battery, lithium sulfur battery, solid state battery, flow battery, or any other type of suitable battery. Battery 104 may further comprise multiple battery cells coupled in series and/or parallel to increase voltage and/or current. The cells of battery 104 may comprise any suitable structure including cylindrical cells, prismatic cells, or pouch cells. Moreover, battery 104 may at least partially comprise other energy storage technologies such as an ultracapacitor. As will be discussed further below, battery 104 may be in thermal communication with a battery coolant loop and a battery refrigeration loop configured to manage heat released from battery 104.

Figure 2:
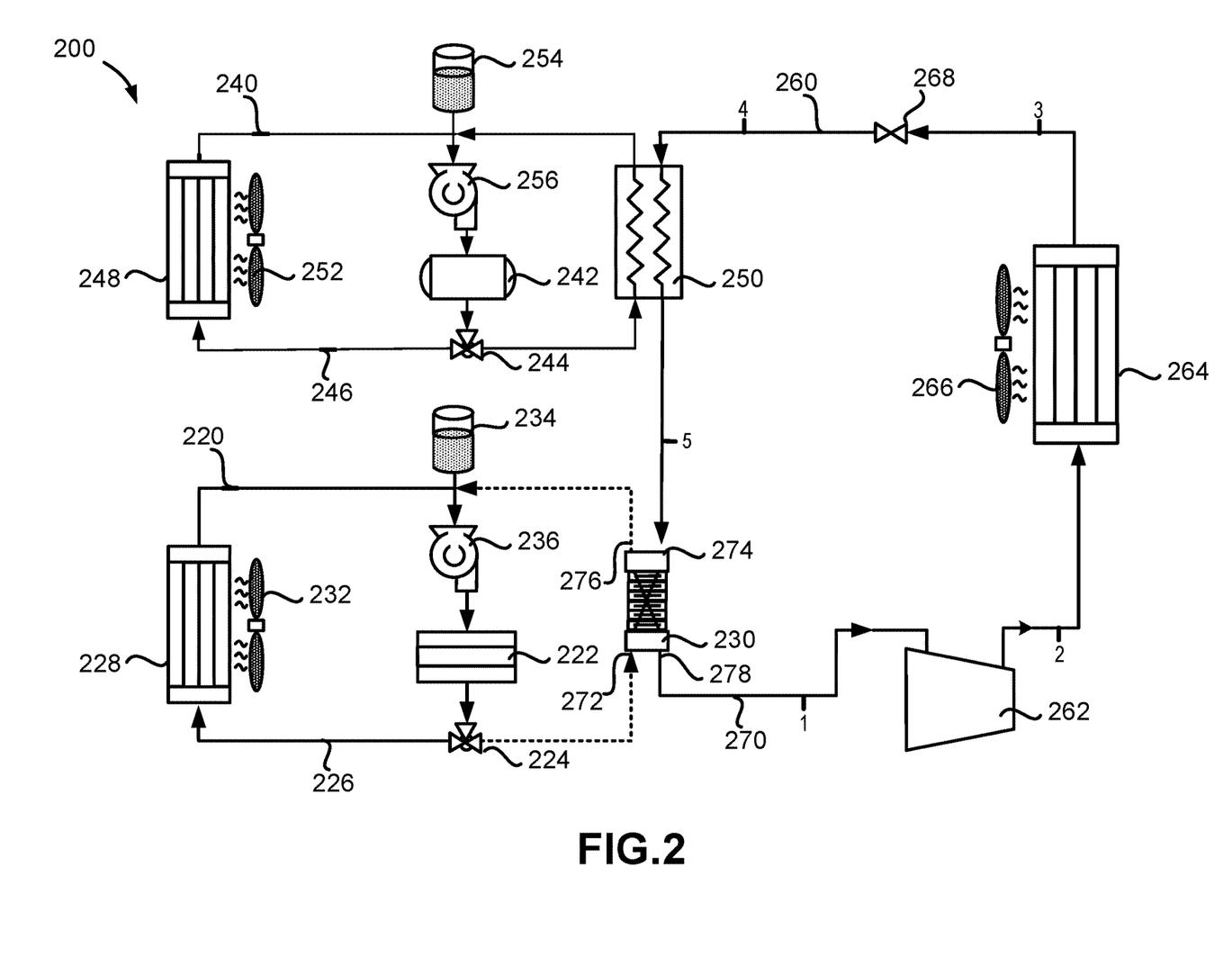
FIG. 2 illustrates a vehicle thermal management system, in accordance with various embodiments.

With reference now to FIG. 2, a vehicle thermal management system 200, which may be similar to thermal management system 106 of FIG. 1, is illustrated in accordance with various embodiments. Thermal management system 200 comprises a fuel cell coolant loop 220, a battery coolant loop 240, and a battery refrigeration loop 260. Fuel cell coolant loop 220 may be configured to remove waste heat from a fuel cell stack 222 to ensure fuel cell stack 222 operates within a desired temperature range, for example for efficiency, safety, longevity, reliability, or other desirable purposes. Similarly, battery coolant loop 240 may be configured to remove waste heat from a battery 242 to ensure battery 242 operates within a desired temperature range, for example for efficiency, safety, longevity, reliability, or other desirable purposes. In the event battery coolant loop 240 is unable to maintain the temperature of battery 242 in a desired temperature range (for example, between about 25 degrees and about 30 degrees Celsius), battery refrigeration loop 260 may provide additional cooling to battery 242 utilizing a vapor-compression refrigeration cycle or other suitable refrigeration cycle.

Fuel cell coolant loop 220 is thermally coupled to fuel cell stack 222 which is thermally coupled to a bypass valve 224 by a fuel cell coolant line 226. Fuel cell coolant line 226 may thermally and fluidly couple all components of fuel cell coolant loop 220 and may thermally and fluidly couple fuel cell coolant loop 220 to fuel cell stack 222. In various embodiments, fuel cell stack 222 may be similar to fuel cell stack 102 discussed with reference to FIG. 1. Fuel cell coolant line 226 may contain a fuel cell coolant that may comprise a liquid or gas that is configured to regulate the temperature of fuel cell stack 222. In various embodiments, the fuel cell coolant in fuel cell coolant line 226 may have a high thermal capacity, a relatively low viscosity, and be chemically inert. The fuel cell coolant may be a gaseous coolant such as air, helium or other inert gas, or liquid such as water, ethylene glycol, propylene glycol, betaine, polyalkylene glycol, or other suitable coolant.

Bypass valve 224 may comprise a diverting valve such as a three-way valve, for example. In other words, bypass valve 224 may include three openings, which, in certain operating conditions, may include one inlet and two outlets. Bypass valve 224 may be configured to receive the fuel cell coolant through the inlet and direct the fuel cell coolant to the first outlet, the second outlet, or a combination of the first outlet and second outlet. For example, the fuel cell coolant in fuel cell coolant line 226 may absorb waste heat from fuel cell stack 222 and be routed to bypass valve 224. Bypass valve 224 may direct the fuel cell coolant to a radiator 228, a superheating heat exchanger 230, or a portion of the fuel cell coolant to both radiator 228 and superheating heat exchanger 230. As will be discussed in further detail below, radiator 228 and/or superheating heat exchanger 230 may be configured to dissipate thermal energy present in the fuel cell coolant.

In various embodiments, radiator 228 may transfer thermal energy stored in the fuel cell coolant (resulting from the transfer of heat from fuel cell stack 222 to the fuel cell coolant) in the form of heat to an external environment (for example, the ambient environment external to vehicle 100). While illustrated as comprising a single radiator, radiator 228 is not limited in this regard and may comprise two or more radiators in series and/or parallel. Radiator 228 may comprise one or more fins (or similar structures or components) which may increase the surface area of the radiator. As heated fuel cell coolant flows through the one or more fins of radiator 228, thermal energy may be transferred to the external environment via (or primarily via) convective heat transfer. As a result, the fuel cell coolant may be cooled as it flows through radiator 228. In various embodiments, radiator 228 may be equipped with a fan 232 which may assist in convective heat transfer to the external environment. However, in various embodiments, radiator 228 may be devoid of a fan and instead may utilize air flowing into and/or around vehicle 100 to assist in heat transfer and therefore reduce power consumption resulting from operation of the fan.

Radiator 228 may be fluidly and thermally coupled to an expansion tank 234 via fuel cell coolant line 226. Expansion tank 234 may be configured to protect fuel cell coolant loop 220 by removing excess pressure resulting from heated fuel cell coolant. For example, fuel cell coolant traveling from radiator 228 or other system components (for example, superheating heat exchanger 230) may be at an elevated temperature despite heat exchange at radiator 228 or other system components. As the fuel cell coolant expands with an increase in temperature, expansion tank 234 may be configured to accommodate the pressure increase to avoid exceeding a critical pressure limit of fuel cell coolant loop 220 and/or prevent undesired venting of the fuel cell coolant. In various embodiments, expansion tank 234 may comprise a compression expansion tank, bladder expansion tank, diaphragm expansion tank, or any other suitable expansion tank type. Expansion tank 234 may be thermally coupled to a pump 236 via fuel cell coolant line 226 wherein the pump 236 may be configured to circulate the fuel cell coolant throughout fuel cell coolant loop 220, including directly to fuel cell stack 222.

With continued reference to FIG. 2, battery coolant loop 240 is thermally coupled to battery 242 which is thermally coupled to a bypass valve 244 by a battery coolant line 246. Battery coolant line 246 may thermally and fluidly couple all components of battery coolant loop 240 and may thermally and fluidly couple battery coolant loop 240 to battery 242. In various embodiments, battery 242 may be similar to battery 104 discussed with reference to FIG. 1. Battery coolant line 246 may contain a battery coolant that may comprise a liquid or gas that is configured to regulate the temperature of battery 242. In various embodiments, the battery coolant in battery coolant line 246 may have a high thermal capacity, a relatively low viscosity, and be chemically inert. The battery coolant may be a gaseous coolant such as air, helium or other inert gas, or liquid such as water, ethylene glycol, propylene glycol, betaine, polyalkylene glycol, or other suitable coolant.

Bypass valve 244 may comprise a diverting valve such as a three-way valve, for example. In other words, bypass valve 244 may include three openings, which, in certain operating conditions, may include one inlet and two outlets. Bypass valve 244 may be configured to receive the battery coolant through the inlet and direct the battery coolant to the first outlet, the second outlet, or a combination of the first outlet and second outlet. For example, the battery coolant in battery coolant line 246 may absorb waste heat from battery 242 and be routed to bypass valve 244. Bypass valve 244 may direct the battery coolant to a radiator 248, a chiller 250, or a portion of the battery coolant to both radiator 248 and chiller 250. As will be discussed in further detail below, radiator 248 and/or chiller 250 may be configured to reduce thermal energy present in the battery coolant.

In various embodiments, radiator 248 may take thermal energy stored in the battery coolant (resulting from the transfer of heat from battery 242 to the battery coolant) and transfer it as heat to an external environment (for example, external to vehicle 100). While illustrated as comprising a single radiator, radiator 248 is not limited in this regard and may comprise two or more radiators in series or parallel. Radiator 248 may comprise one or more fins (or similar structures or components) which may increase the surface area of the radiator. As heated battery coolant flows through the one or more fins of radiator 248, thermal energy may be transferred to the external environment via (or primarily via) convective heat transfer. As a result, the battery coolant may be cooled as it flows through radiator 248. In various embodiments, radiator 248 may be equipped with a fan 252 which may assist in convective heat transfer to the external environment. However, in various embodiments, radiator 248 may be devoid of a fan and instead may utilize air flowing into and/or around vehicle 100 to assist in heat transfer and therefore reduce power consumption resulting from operation of the fan.

Radiator 248 may be fluidly and thermally coupled to an expansion tank 254 via battery coolant line 246. Expansion tank 254 may be configured to protect battery coolant loop 240 by removing excess pressure resulting from heated battery coolant. For example, battery coolant traveling from radiator 248 or other system components (for example, chiller 250) may be at an elevated temperature despite heat exchange at radiator 248 or other system components. As the battery coolant expands with an increase in temperature, expansion tank 254 may be configured to accommodate the pressure increase to avoid exceeding a critical pressure limit of battery coolant loop 240 and/or prevent undesired venting of the battery coolant. In various embodiments, expansion tank 254 may comprise a compression expansion tank, bladder expansion tank, diaphragm expansion tank, or any other suitable expansion tank type. Expansion tank 254 may be thermally coupled to a pump 256 via battery coolant line 246 wherein the pump 256 may be configured to circulate the battery coolant throughout battery coolant loop 240, including directly to battery 242.

Under certain operating conditions, radiator 248 may be unable to dissipate a desired amount of thermal energy from the battery coolant and/or be unable to dissipate thermal energy from the battery coolant at a desired rate. For example, elevated ambient temperatures may decrease a temperature gradient between the heated battery coolant and the ambient environment, thereby decreasing the rate of convective heat transfer from the battery coolant to the ambient environment by radiator 248. To address such situations, in various exemplary embodiments battery coolant loop 240 may be equipped with chiller 250, which may be thermally coupled to refrigeration loop 260, to provide additional cooling for battery 242 in certain situations. Chiller 250 may serve as a heat exchanger where excess thermal energy in the battery coolant may be transferred to refrigeration loop 260 which may utilize a vapor-compression refrigeration cycle to absorb and dissipate the excess thermal energy. In various embodiments, chiller 250 may comprise an air chiller, water chiller, or other suitable heat exchange system.

As discussed above, thermal management system 200 may further comprise battery refrigeration loop 260. Battery refrigeration loop 260 may be thermally coupled to battery coolant loop 240 via chiller 250 and may be thermally coupled to fuel cell coolant loop 220 via superheating heat exchanger 230. Battery refrigeration loop 260 further comprises a compressor 262, a condenser 264 comprising a fan 266, and an expansion valve 268. Superheating heat exchanger 230, compressor 262, condenser 264, expansion valve 268, and chiller 250 may be thermally coupled via battery refrigeration line 270 to form battery refrigeration loop 260.

Battery refrigeration line 270 may contain a battery refrigerant configured to circulate throughout battery refrigeration loop 260 and undergo various phase, temperature, and/or pressure changes to absorb and dissipate thermal energy from various portions of thermal management system 200. In various embodiments, the battery refrigerant may comprise a fluid having a high latent heat of vaporization, moderate density in liquid form, high density in gaseous form, and high critical temperature. For example, the battery refrigerant may comprise a fluid containing various compounds such as fluorocarbons, ammonia, sulfur dioxide, or non-halogenated hydrocarbons among others. Further, the battery refrigerant may comprise a class 1, class 2, or class 3 refrigerant in various embodiments.

In various embodiments, the battery refrigerant may be configured to enter the compressor 262 in a gaseous state through battery refrigeration line 270 at point (1). In other words, the battery refrigerant may ideally comprise a vapor having a relatively low temperature and a relatively low pressure when entering compressor 262. Compressor 262 may compress the battery refrigerant thereby increasing the battery refrigerant pressure and temperature. Compressor 262 requires power to compress the battery refrigerant and may utilize an electric motor or other suitable power source. In various embodiments, compressor 262 may be a scroll, screw, centrifugal, reciprocating, or other suitable type of compressor. The battery refrigerant may exit compressor 262 as a superheated vapor at point (2).

The battery refrigerant, now in the form of a superheated vapor, may proceed through battery refrigeration line 270 to condenser 264. Condenser 264, which may be an air-cooled, evaporative, or water-cooled condenser, may contain one or more coils configured to contain the battery refrigerant entering condenser 264 through battery refrigeration line 270. Air, water, or other suitable cooling fluid may flow across the coils to extract thermal energy from battery refrigerant and eject the thermal energy as heat to the external environment. Fan 266 may serve to increase convective heat transfer from the battery refrigerant to the cooling fluid and/or assist in directing the cooling fluid out of condenser 264. The battery refrigerant may exit condenser 264 as a cooled, saturated liquid at point (3).

The battery refrigerant, now in the form of a saturated liquid, may proceed through battery refrigeration line 270 to expansion valve 268. Expansion valve 268 may be configured to control the amount of battery refrigerant that enters chiller 250 and may be configured to ensure that the battery refrigerant exits chiller 250 as a superheated vapor. For example, expansion valve 268 may comprise a thermal expansion valve (TXV) which may comprise a temperature sensing bulb filled with a gas or liquid that causes the valve to open by biasing a spring pressure element as temperature on the bulb increases. On the other hand, if the temperature on the bulb decreases, pressure in the bulb may decrease and allow the valve to close. Alternatively, expansion valve 268 may be an electronic expansion valve (EXV) which may be electrically controlled using a control algorithm to ensure the battery refrigerant exits chiller 250 at a desired temperature and pressure (and/or within desired temperature and pressure ranges, for example between about 10° C. and about 30° C., and between about 30 PSIG and 70 PSIG). For example, one or more pressure and/or temperature sensors may be positioned downstream of chiller 250 which may signal a desire for expansion valve 268 to increase or decrease a flow rate of battery refrigerant flowing through expansion valve 268. In various embodiments, expansion valve 268 may be an internally or externally equalized valve. Expansion valve 268 may be configured to abruptly decrease a pressure of the battery refrigerant. Such a decrease in pressure may result in flash evaporation of a portion of the liquid battery refrigerant and may lower the temperature of the battery refrigerant, now a liquid-vapor mixture at point (4).

As discussed briefly above, the battery refrigerant may be configured to cool battery 242 by exchanging heat between the cooled battery refrigerant exiting expansion valve 268 and heated battery coolant exiting bypass valve 244. For example, in various embodiments, chiller 250 may comprise a concurrent or countercurrent heat exchanger comprising a series of conduits for the battery refrigerant and battery coolant. As the battery refrigerant and battery coolant flow through chiller 250, thermal energy may be transferred from the battery coolant to the battery refrigerant. As a result, additional cooling may be provided to battery 242.

In most circumstances, expansion valve 268, and the heat transfer between the battery coolant and the battery refrigerant in chiller 250, ensures that the battery refrigerant exits chiller 250 as a vapor at point (5). For example, expansion valve 268 may decrease the flow rate of battery refrigerant into chiller 250. As a result, heat transfer from the heated battery coolant to the battery refrigerant will result in complete evaporation of the battery refrigerant. This ensures that liquid does not enter compressor 262, as any liquid entering compressor 262 may damage compressor 262. However, in other circumstances, such as circumstances in which battery 242 is inoperative or in partial operation, battery 242 may be unable to generate adequate heat to fully vaporize the battery refrigerant in chiller 250. As a result, liquid battery refrigerant may enter, and therefore damage, compressor 262.

In order to ensure that the battery refrigerant enters compressor 262 as a fully vaporized battery refrigerant, superheating heat exchanger 230 may be thermally coupled between fuel cell coolant loop 220 and battery refrigerant loop 260. In various embodiments, superheating heat exchanger 230 may comprise a two-phase heat exchanger configured to exchange heat between the fuel cell coolant in fuel cell coolant loop 220 and the battery refrigerant in battery refrigeration loop 260. For example, heat emitted from fuel cell stack 222 may be absorbed by the fuel cell coolant. Bypass valve 224 may direct all or a portion of the heated fuel cell coolant toward first inlet 272 of superheating heat exchanger 230 through fuel cell coolant line 226. At the same time, the battery refrigerant exiting chiller 250 may enter second inlet 274 of superheating heat exchanger 230 through battery refrigeration line 270. The heated fuel cell coolant and battery refrigerant may flow through superheating heat exchanger 230 concurrently or countercurrently and the heated fuel cell coolant may convectively transfer heat to the battery refrigerant. The now cooled fuel cell coolant may exit superheating heat exchanger 230 via first outlet 276 and may flow through fuel cell coolant line 226 to expansion tank 234 and/or pump 236 and vaporized battery refrigerant may exit superheating heat exchanger 230 via second outlet 278 and may flow toward battery refrigeration line 270 to compressor 262.

As a result, any remaining liquid battery refrigerant may be vaporized prior to entering compressor 262. Moreover, rather than dissipating waste heat from fuel cell stack 222 to the ambient environment via radiator 228, this heat may be recycled into thermal management system 200, thereby increasing the thermal efficiency of thermal management system 200. The burden on radiator 228 to dissipate all heat generated by fuel cell stack 222 may thus be reduced, which in turn, may reduce power utilized by fan 232 to assist radiator 228 in heat transfer while also allowing thermal management system 200 to be equipped with a smaller compressor. As a result, the space occupied and energy required by radiator 228 may be reduced. Superheating heat exchanger 230 may also be utilized during vehicle 100, for example start-up to stabilize battery refrigeration loop 260 by generating a heat load prior to battery 242 requiring cooling and reduce lag time associated with a switch from the battery coolant loop 240 to the battery refrigeration loop 260. Because the battery refrigerant is completely vaporized by superheating heat exchanger 230, battery refrigeration line 270 may be devoid of an accumulator downstream of chiller 250, thereby decreasing system cost and complexity. Additionally, by fully vaporizing and further increasing the temperature of the battery refrigerant before it enters compressor 262, the power utilized by compressor 262 (or motor associated therewith) to compress the battery refrigerant to a desired temperature and pressure may be reduced, thereby minimizing power output by battery 242. In such a way, energy in battery 242 may be maintained and range of vehicle 100 extended.

Figure 3A:
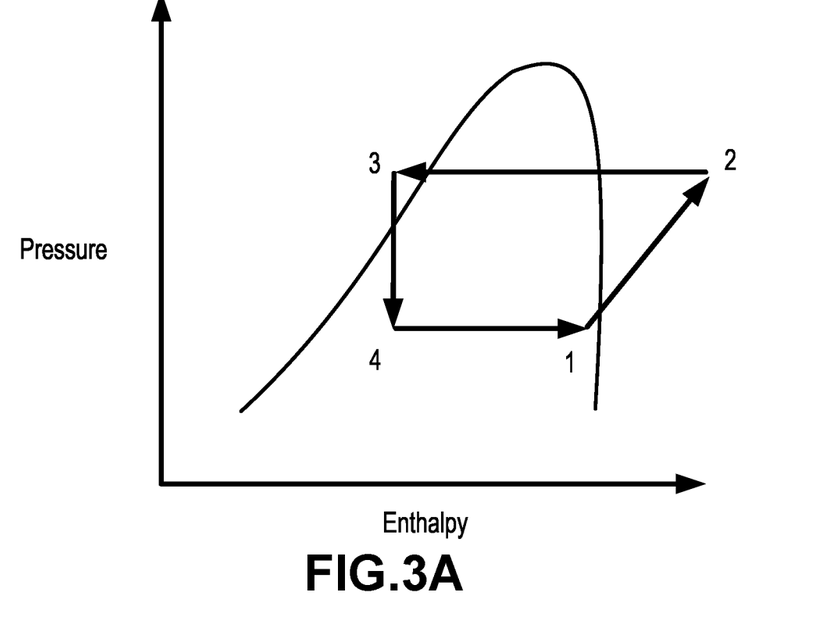
FIGS. 3A and 3B illustrate a pressure-enthalpy chart of a traditional battery refrigeration loop and a pressure-enthalpy chart of a battery refrigeration loop of the present disclosure, respectively, in accordance with various embodiments.
Figure 3B:
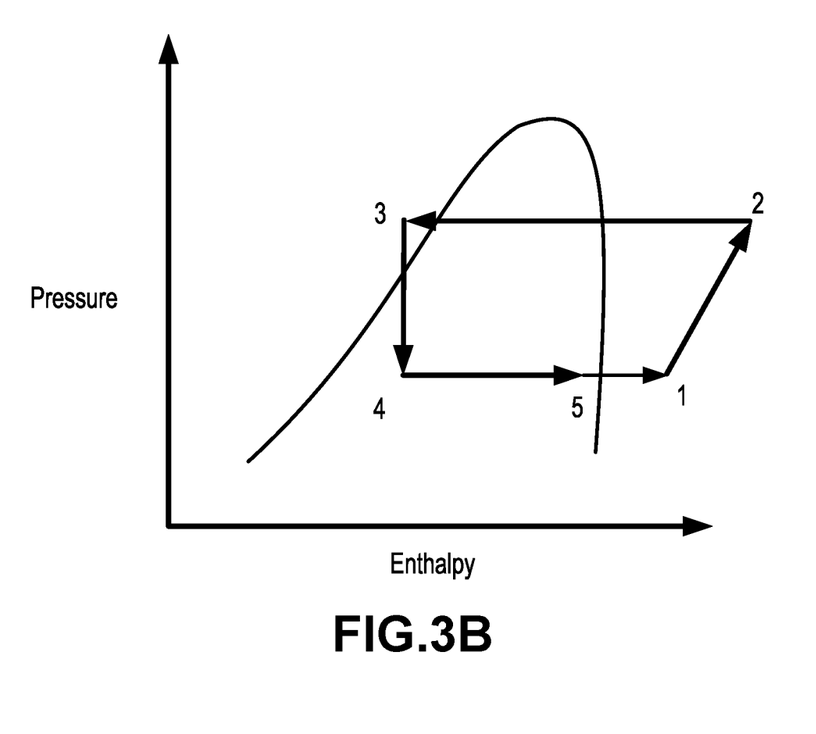

Exemplary benefits of thermal management system 200 can be illustrated by the pressure-enthalpy charts illustrated in FIGS. 3A and 3B. FIG. 3A illustrates various phase changes of a refrigerant traveling through a conventional vapor-compression refrigeration cycle. Point (1) represents a liquid-vapor mixture exiting a chiller, point (2) represents a high pressure, high temperature vapor exiting the compressor, point (3) represents a cooled liquid exiting a condenser, and point (4) represents a low pressure, low temperature liquid-vapor mixture exiting an expansion valve. As can be seen, point (1) falls near the two-phase curve line indicating that, at low enough enthalpies, the refrigerant may comprise a liquid-vapor mixture when entering the compressor.

FIG. 3B illustrates a pressure-enthalpy chart associated with a battery refrigeration loop similar to battery refrigeration loop 260 described above. Point (5) corresponds to point (1) of FIG. 3A and represents a liquid-vapor mixture exiting a chiller. As can be seen, waste heat from a fuel cell is added to the refrigerant by the superheating heat exchanger between points (5) and (1). As a result, the refrigerant transitions from a liquid-vapor mixture exiting the chiller to a high temperature vapor exiting the superheating heat exchanger. This can be seen from the location of point (1) which is located to the right of the two-phase curve in FIG. 3B. As a result, exemplary benefits of thermal management system 200 previously discussed may be achieved.

Figure 4:
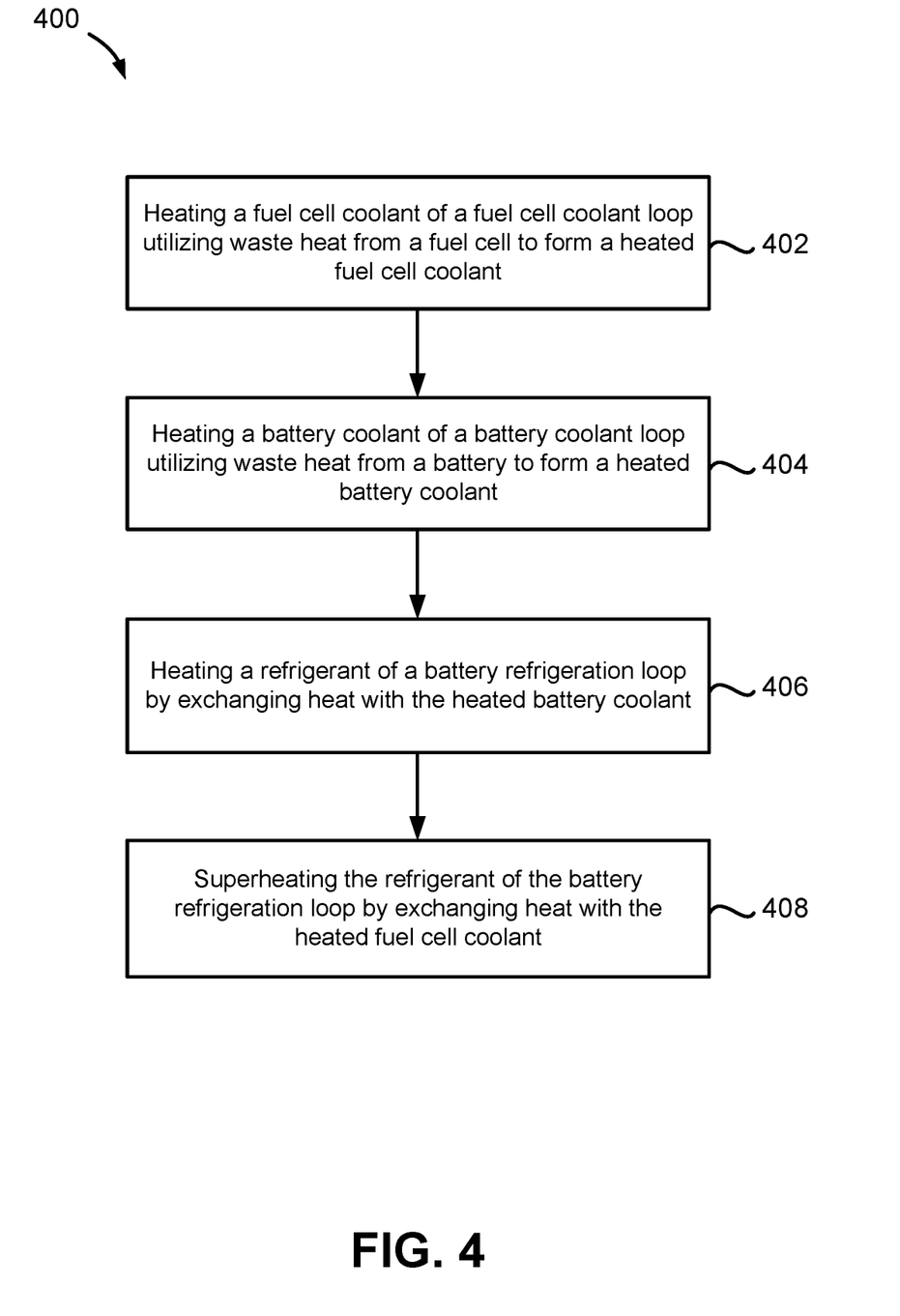
FIG. 4 illustrates a block diagram of a method of managing a thermal load in a fuel cell vehicle, in accordance with various embodiments.

With reference now to FIG. 4, a block diagram illustrating a method 400 of managing thermal loads in a fuel cell vehicle is illustrated in accordance with various embodiments. Method 400 may comprise heating a fuel cell coolant of a fuel cell coolant loop utilizing waste heat from a fuel cell to form a heated fuel cell coolant (step 402). Method 400 may further comprise heating a battery coolant of a battery coolant loop utilizing waste heat from a battery to form a heated battery coolant (step 404). Method 400 may further comprise heating a refrigerant of a battery refrigeration loop by exchanging heat with the heated battery coolant (step 406). Method 400 may further comprise superheating the refrigerant of the battery refrigeration loop by exchanging heat with the heated fuel cell coolant (step 408).

Figure 5:
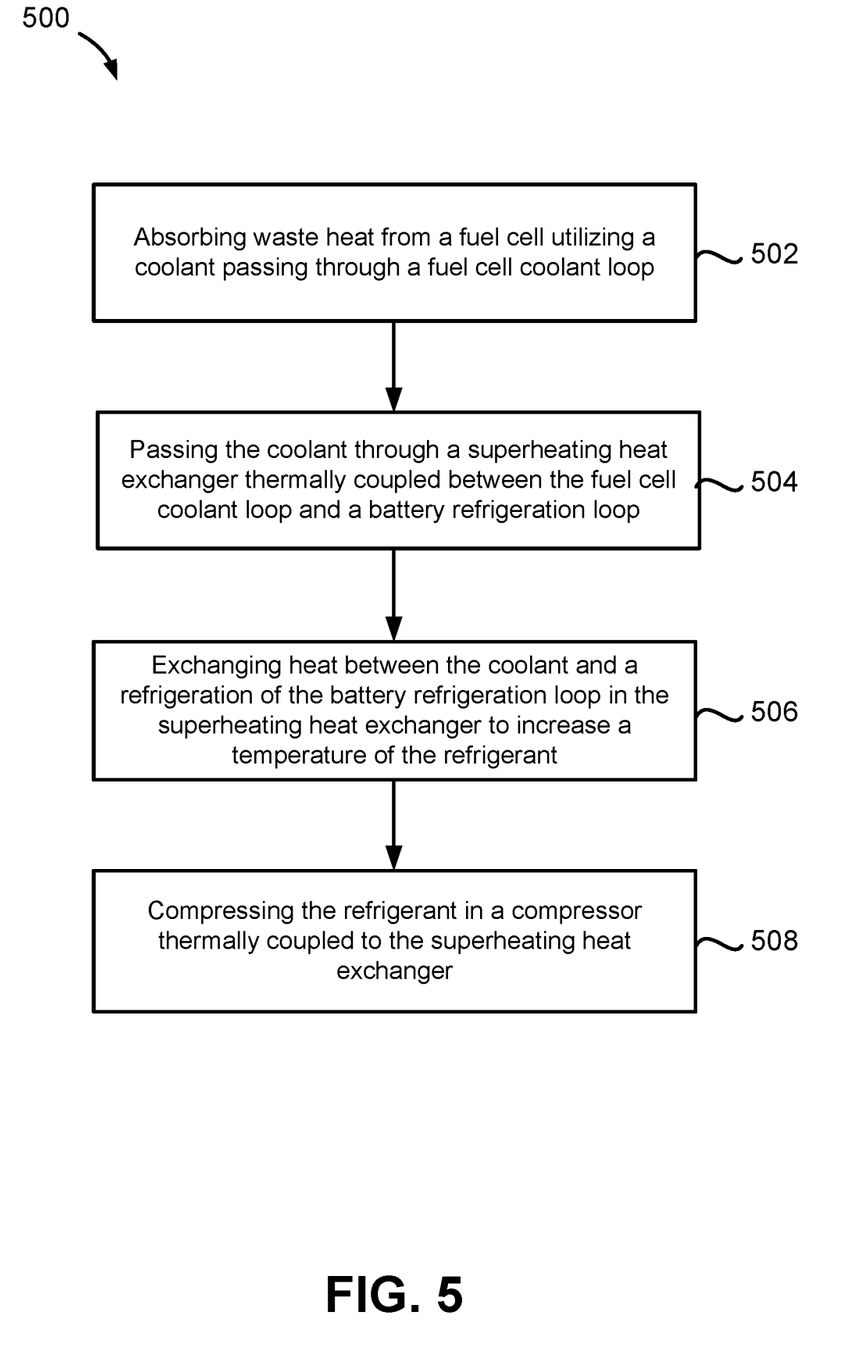
FIG. 5 illustrates a block diagram of a method of utilizing waste heat from a fuel cell, in accordance with various embodiments.

With reference now to FIG. 5, a block diagram illustrating a method 500 of utilizing waste heat from a fuel cell is illustrated in accordance with various embodiments. Method 500 may comprise absorbing waste heat from a fuel cell utilizing a coolant passing through a fuel cell coolant loop (step 502). Method 500 may further comprise passing the coolant through a superheating heat exchanger thermally coupled between the fuel cell coolant loop and a battery refrigeration loop (step 504). Method 500 may further comprise exchanging heat between the coolant and a refrigerant of the battery refrigeration loop in the superheating heat exchanger to increase a temperature of the refrigerant (step 506). Method 500 may further comprise compressing the refrigerant in a compressor thermally coupled to the superheating heat exchanger (step 508).

It will be appreciated that, in accordance with principles of the present disclosure, waste heat from sources other than and/or in addition to a fuel cell may be exchanged with a refrigerant of the battery refrigeration loop in the superheating heat exchanger to increase a temperature of the refrigerant. For example, waste heat arising from fueling of a compressed hydrogen tank, from operation of power electronics associated with vehicle 100, from frictional heating of braking components on vehicle 100, and/or from sources on and/or in a trailer associated with or coupled to vehicle 100 may be utilized to fully vaporize the refrigerant.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thermal management system for a fuel cell vehicle, comprising:
 a battery;
 a fuel cell;
 a battery coolant loop thermally coupled to the battery and comprising a first radiator and a chiller;
 a fuel cell coolant loop thermally coupled to the fuel cell and comprising a second radiator and a superheating heat exchanger; and
 a battery refrigeration loop comprising the superheating heat exchanger thermally coupled to the chiller and a compressor,
 wherein the superheating heat exchanger is configured to transfer waste heat from the fuel cell to a refrigerant of the battery refrigeration loop prior to the refrigerant entering the compressor.

2. The thermal management system of claim 1, wherein the battery coolant loop further comprises a first pump, a first bypass valve, and a first expansion tank.

3. The thermal management system of claim 2, wherein the fuel cell coolant loop further comprises a second pump, a second bypass valve, and a second expansion tank.

4. The thermal management system of claim 1, wherein the battery refrigeration loop further comprises a condenser and an expansion valve.

5. The thermal management system of claim 2, wherein the battery, the first radiator, the chiller, the first pump, the first bypass valve, and the first expansion tank are thermally and fluidly coupled via a battery coolant line.

6. The thermal management system of claim 3, wherein the fuel cell, the second radiator, the second pump, the second bypass valve, and the second expansion tank are thermally and fluidly coupled via a fuel cell coolant line.

7. The thermal management system of claim 4, wherein the superheating heat exchanger, the chiller, the compressor, the condenser, and the expansion valve are thermally and fluidly coupled via a battery refrigerant line.

8. The thermal management system of claim 1, wherein the fuel cell comprises a proton-exchange membrane (PEM) fuel cell and forms a portion of a fuel cell stack.

9. The thermal management system of claim 3, wherein the first bypass valve and the second bypass valve each comprise a three-way valve.

10. The thermal management system of claim 2, wherein the first bypass valve is configured to selectively divert flow of a battery coolant in the battery coolant loop to the first radiator, the chiller, or a combination of the first radiator and the chiller.

11. The thermal management system of claim 3, wherein the second bypass valve is configured to selectively divert flow of a fuel cell coolant in the fuel cell coolant loop to the second radiator, the superheating heat exchanger, or a combination of the second radiator and the superheating heat exchanger.

12. The thermal management system of claim 1, wherein the first radiator and the second radiator each comprise a fan configured to assist in convective heat transfer to an external environment.

* * * * *